(12) United States Patent
Winkelkemper et al.

(10) Patent No.: US 8,461,714 B2
(45) Date of Patent: Jun. 11, 2013

(54) DIRECT CONVERTER AND SYSTEM INCLUDING A DIRECT CONVERTER

(75) Inventors: Manfred Winkelkemper, Ennetbaden (CH); Arthur Korn, Baden (CH)

(73) Assignee: ABB Schweiz AG, Zurich (CH)

( * ) Notice: Subject to any disclaimer, the term of this patent is extended or adjusted under 35 U.S.C. 154(b) by 335 days.

(21) Appl. No.: 12/889,717

(22) Filed: Sep. 24, 2010

(65) Prior Publication Data

US 2011/0075465 A1    Mar. 31, 2011

(30) Foreign Application Priority Data

Sep. 29, 2009  (EP) .................................... 09171606

(51) Int. Cl.
*F03D 9/00* (2006.01)
(52) U.S. Cl.
USPC .............................................. 290/55; 363/37
(58) Field of Classification Search
USPC ............... 363/16, 17, 34–41, 71, 97, 98, 126, 363/127, 131, 132; 318/492, 800–811, 773; 323/305, 315, 287, 351
See application file for complete search history.

(56) References Cited

U.S. PATENT DOCUMENTS

| | | | | |
|---|---|---|---|---|
| 5,198,970 A | * | 3/1993 | Kawabata et al. | 363/37 |
| 5,315,497 A | * | 5/1994 | Severinsky | 363/34 |
| 5,661,390 A | * | 8/1997 | Lipo et al. | 318/803 |
| 5,982,645 A | * | 11/1999 | Levran et al. | 363/37 |
| 5,986,419 A | * | 11/1999 | Archer et al. | 318/400.02 |
| 6,529,034 B1 | * | 3/2003 | Ranjan | 326/19 |
| 6,900,998 B2 | * | 5/2005 | Erickson et al. | 363/159 |
| 7,332,827 B2 | * | 2/2008 | Nielsen | 290/55 |
| 7,957,166 B2 | * | 6/2011 | Schnetzka et al. | 363/56.03 |
| 2004/0022081 A1 | | 2/2004 | Erickson et al. | |
| 2008/0315819 A1 | | 12/2008 | Ueda | |

FOREIGN PATENT DOCUMENTS

WO    WO 2005/124985 A1    12/2005

OTHER PUBLICATIONS

European Search Report dated Mar. 19, 2010.

* cited by examiner

*Primary Examiner* — Rajnikant Patel
(74) *Attorney, Agent, or Firm* — Buchanan Ingersoll & Rooney PC (57) ABSTRACT

A direct converter includes n input phase connections and p output phase connections, where n≧2 and p≧2. The direct converter also includes (n·p) two-pole switching cells for switching at least one positive voltage and at least one negative voltage between the poles. Each output phase connection is connected in series with each input phase connection, respectively, via a switching cell. To enable any desired and continuous current flow setting from an input phase connection to an output phase connection of the direct converter and, moreover, to exchange electrical energy between the two-pole switching cells of the direct converter, at least one inductance is connected into each series connection. A system including a direct converter is also provided.

22 Claims, 8 Drawing Sheets

DIRECT CONVERTER AND SYSTEM INCLUDING A DIRECT CONVERTER

RELATED APPLICATION

This application claims priority under 35 U.S.C. §119 to European Patent Application No. 09171606.8 filed in Europe on Sep. 29, 2009, the entire content of which is hereby incorporated by reference in its entirety.

FIELD

The present disclosure relates to the field of power electronics. More particularly, the present disclosure relates to a direct converter and to a system including such a direct converter.

BACKGROUND INFORMATION

In the past, direct converters, such as matrix converters, for example, were rather of academic importance. Nowadays, however, direct converters are gaining in importance in areas such as industrial applications. By means of a direct converter, an input voltage or an input current having a first amplitude and a first frequency can be converted directly into an output voltage or respectively into an output current having a second amplitude and a second frequency, without a complex DC voltage intermediate circuit or DC current intermediate circuit. Such a direct converter is disclosed in U.S. Pat. No. 6,900,998, for example, wherein the direct converter has n=3 input phase connections and p=3 output phase connections. In other words, the direct converter in U.S. Pat. No. 6,900,998 is embodied in a three-phase fashion on the input side and on the output side. The direct converter in U.S. Pat. No. 6,900,998 B2 also includes nine two-pole switching cells for switching a positive and a negative voltage between the poles, where each output phase connection is connected in series with each input phase connection directly via a switching cell, respectively.

However, in the direct converter according to U.S. Pat. No. 6,900,998, the voltage at each branch, i.e., at each two-pole switching cell, cannot be set in such a way that a continuous current flow from an input phase connection to an output phase connection can be obtained. As a result, it is not possible to achieve an active current setting through the respective branches. Furthermore, no or only a very limited exchange of electrical energy between individual branches is possible with the direct converter in U.S. Pat. No. 6,900,998. However, if the direct converter is intended to be able to transfer large amounts of electrical energy, then the capacitances of the switching cells in U.S. Pat. No. 6,900,998 B2 have to be implemented with correspondingly large dimensioning, which results in a huge space requirement for such a direct converter and considerable costs. As a result, systems constructed with direct converters of this type will likewise have a correspondingly large space requirement and be correspondingly expensive.

SUMMARY

An exemplary embodiment provides a direct converter. The exemplary direct converter includes n input phase connections (n≧2), p output phase connections (p≧2), and (n·p) two-pole switching cells for switching at least one positive voltage and at least one negative voltage between the poles. Each output phase connection is respectively connected in series with each input phase connection via a corresponding one of the switching cells. At least one inductance is connected into each series connection of a corresponding one of the n input phase connections and a corresponding one of the p output phase connections.

BRIEF DESCRIPTION OF THE DRAWINGS

Additional refinements, advantages and features of the present disclosure are described in more detail below with reference to exemplary embodiments illustrated in the drawings, in which.

The reference symbols used in the drawings and their meanings are summarized in the List of reference symbols. In principle, identical parts and/or identically functioning parts are provided with identical reference symbols in the drawings. The embodiments described represent examples of the subject matter of the present disclosure and have no limiting effect.

DETAILED DESCRIPTION

Exemplary embodiments of the present disclosure provide a direct converter which allows any desired and continuous current flow setting from an input phase connection to an output phase connection of the direct converter and, moreover, which allows exchange of electrical energy between two-pole switching cells of the direct converter. Exemplary embodiments of the present disclosure also provide a system including such a direct converter according to the disclosure.

According to an exemplary embodiment, the direct converter includes n input phase connections and p output phase connections, where n≧2 and p≧2. Furthermore, the direct converter includes n·p two-pole switching cells for switching at least one positive voltage and at least one negative voltage between the poles. Each output phase connection is connected in series with each input phase connection respectively via a switching cell. According to an exemplary embodiment of the present disclosure, at least one inductance is now connected into each series connection. The inductance in each series connection, i.e., in each branch between an input phase connection and an output phase connection, advantageously enables a voltage setting by the switching cells in such a way that a continuous current flow from an input phase connection to an output phase connection can be obtained, which thereby makes it possible to achieve an active current setting through the respective branch. Furthermore, virtually any desired exchange of electrical energy between individual branches is possible with the direct converter according to the present disclosure.

Exemplary embodiments also provide a system including the above-mentioned direct converter, where the direct converter can be connected to an electrical AC voltage system at the input phase connections via a transformer. As an alternative to this, the direct converter according to the disclosure can be connected to the electrical AC voltage system at at least one input phase connection of the direct converter via an input volt current limiting inductor. Overall, the system according to the disclosure is thus constructed in an extremely simple manner.

Figure 1:
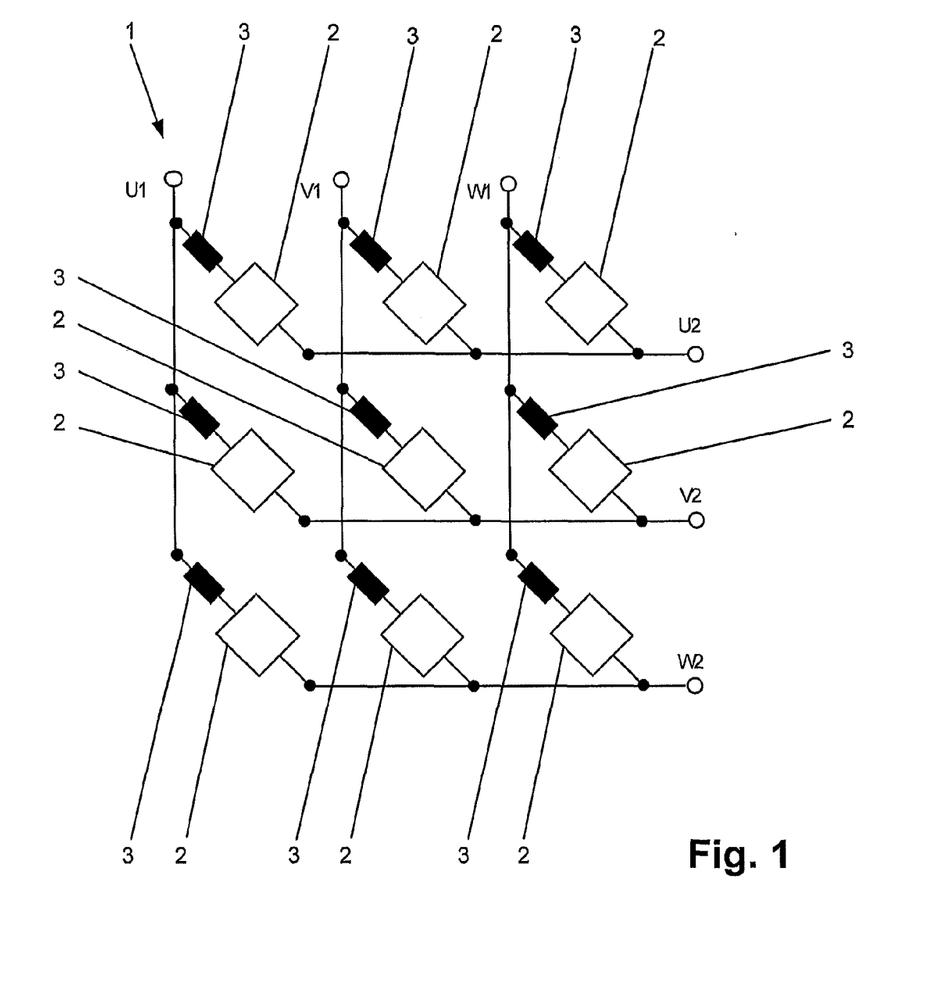
FIG. 1 shows a first exemplary embodiment of a direct converter.
Figure 2:
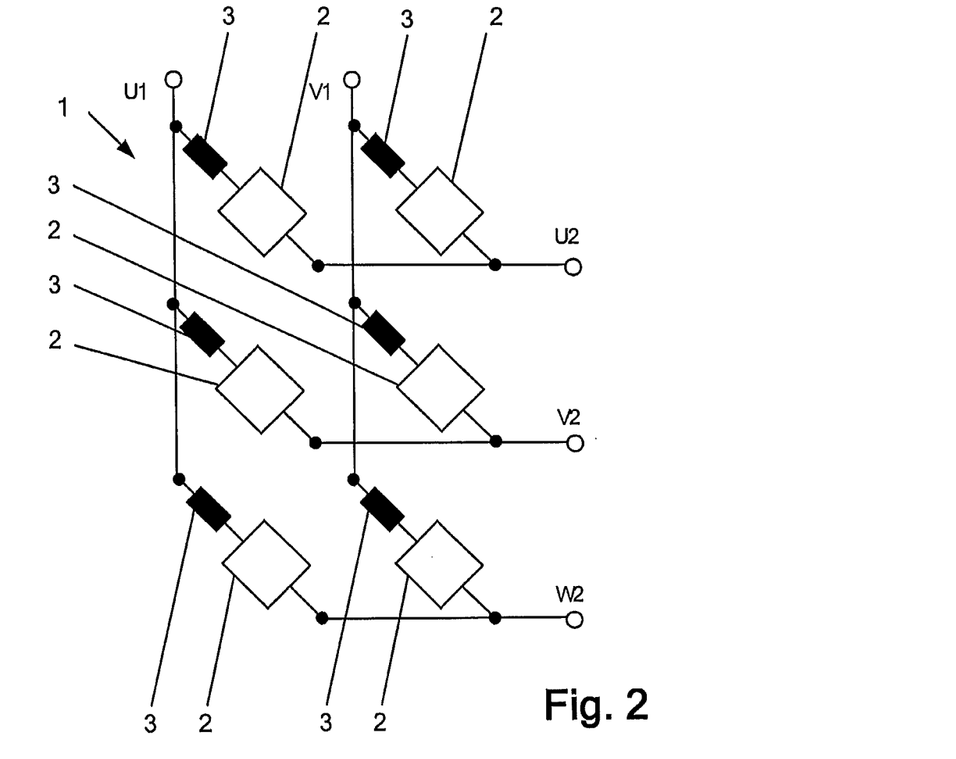
FIG. 2 shows a second exemplary embodiment of a direct converter.
Figure 3:
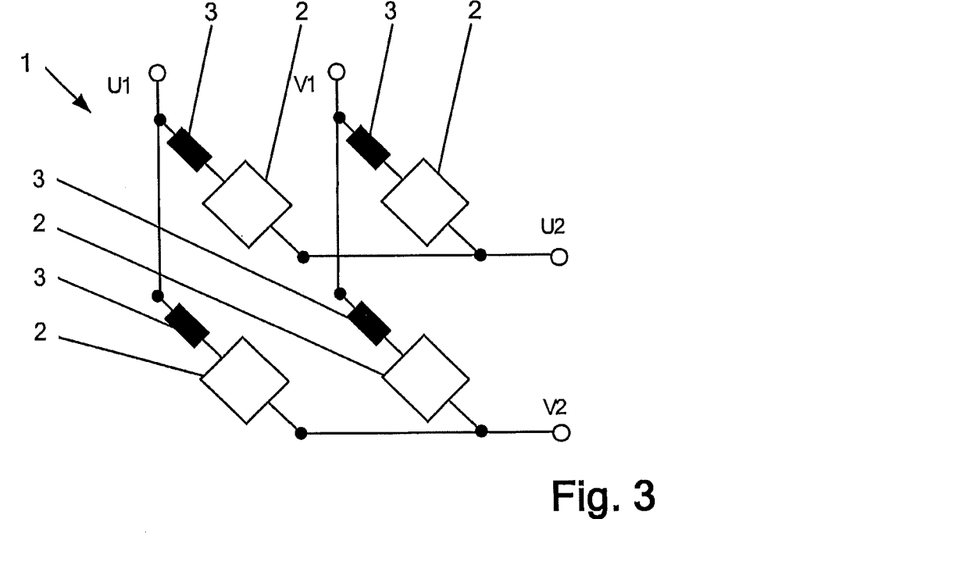
FIG. 3 shows a third exemplary embodiment of a direct converter.
Figure 4:
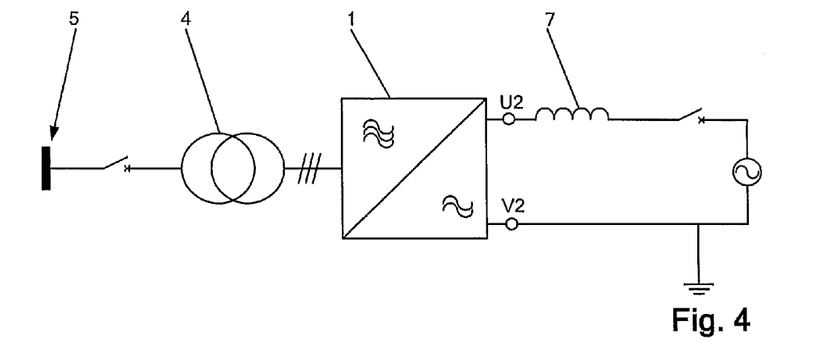
FIG. 4 shows a first exemplary embodiment of a system.
Figure 5:
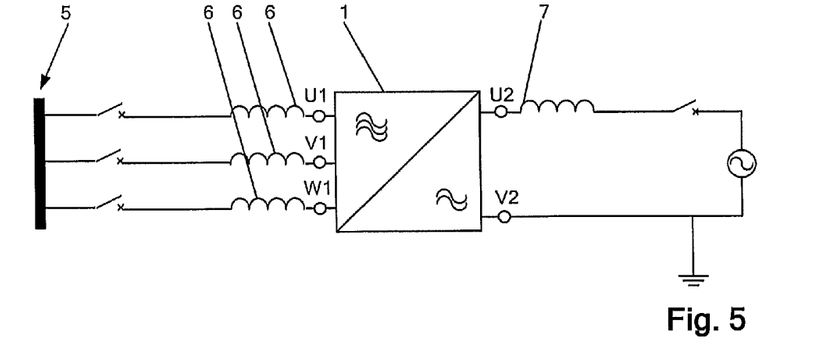
FIG. 5 shows a second exemplary embodiment of a system.
Figure 6:
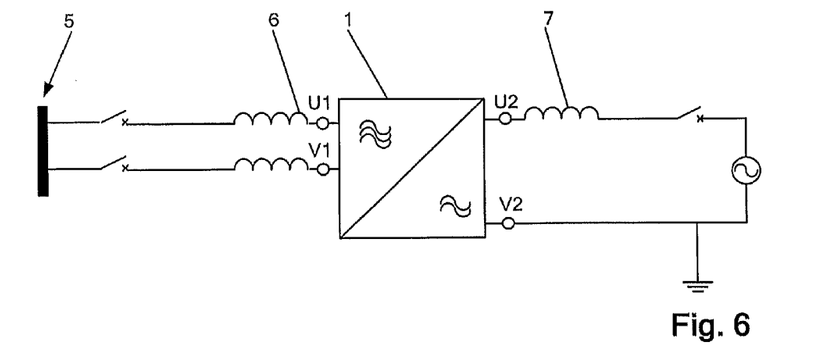
FIG. 6 shows a third exemplary embodiment of a system.

According to an exemplary embodiment illustrated in FIG. 1, a direct converter 1 includes n input phase connections U1, V1, W1, and p output phase connections U2, V2, W2, where n≧2 and p≧2. Furthermore, the direct converter 1 includes n·p two-pole switching cells 2 for switching at least one positive voltage and at least one negative voltage between the poles. Each output phase connection U2, V2, W2 is respectively connected in series with each input phase connection U1, V1, W1 via a switching cell 2. FIG. 1 shows this series connection by way of example for a direct converter including n=3 input phase connections U1, V1, W1 and p=3 output phase connections U2, V2, W2. Furthermore, FIG. 2 shows an example of a direct converter including n=2 input phase connections U1, V1 and p=3 output phase connections U2, V2, W2, and FIG. 3 shows an example of a direct converter including n=2 input phase connections U1, V1 and p=2 output phase connections U2, V2.

According to an exemplary embodiment of the present disclosure, at least one inductance 3 is connected into each series connection, that is to say, into the respective connection between an output phase connection U2, V2, W2 and an input phase connection U1, V1, W1, via the associated two-pole switching cell 2. The inductance 3 in each series connection, i.e., in each branch between an input phase connection U1, V1, W1 and an output phase connection U2, V2, W2, advantageously enables a voltage setting by the switching cells 2 in such a way that a continuous current flow from an input phase connection U1, V1, W1 to an output phase connection U2, V2, W2 can be achieved. As a result, an active current setting through the respective branch is made possible. Furthermore, virtually any desired exchange of electrical energy between individual branches is possible with the direct converter 1 according to the above-described exemplary embodiment of the present disclosure.

According to an exemplary embodiment, each switching cell 2 can have four drivable bidirectional power semiconductor switches having a controlled unidirectional current-carrying direction. The power semiconductor switches can be connected in the manner of a bridge circuit, for example, and a capacitive energy store can be connected in parallel with the bridge circuit of the power semiconductor switches. Two-pole switching cells 2 are also conceivable, however, which are generally embodied as multilevel circuits and are able to switch at least one positive voltage and at least one negative voltage between the poles.

The drivable bidirectional power semiconductor switch having a controlled unidirectional current-carrying direction can be embodied, for example, as a gate turn-off thyristor (GTO) or as an integrated thyristor having a commutated drive electrode (IGCT—Integrated Gate Commutated Thyristor) with a respective diode reverse-connected in parallel. It is also conceivable, however, for a drivable power semiconductor switch to be embodied, for example, as a power MOSFET with, in addition, a diode reverse-connected in parallel, or as an insulated gate bipolar transistor (IGBT) with, in addition, a diode reverse-connected in parallel. By means of the virtual any amount of desired exchange—as already mentioned above—of electrical energy between individual branches and thus between individual switching cells 2, in the case of a direct converter 1 which is intended to be able to transfer large amounts of electrical energy, the capacitive energy stores of the switching cells can advantageously be implemented with correspondingly small dimensioning, which results in a significant space saving and a significant reduction of the costs relative to known direct converters. As a result, systems constructed with direct converters of this type can likewise have a correspondingly small space requirement and be correspondingly cost-effective.

In accordance with an exemplary embodiment of a direct converter according to the present disclosure, at least one further two-pole switching cell 2 for switching at least one positive voltage and at least one negative voltage between the poles can be connected into each series connection. As a result, the voltage to be switched, e.g., the voltage-carrying capacity, across the entire series connection between an input phase connection U1, V1, W1 and an output phase connection U2, V2, W2 can advantageously be increased.

It is also conceivable for at least one further two-pole switching cell 2, for example, as embodied in the manner described above, for switching at least one positive and at least one negative voltage between the poles to be connected in parallel with each switching cell 2. As a result, it is advantageously possible to achieve a higher current, such as an increased current-carrying capacity, through the entire series connection between an input phase connection U1, V1, W1 and an output phase connection U2, V2, W2. It is also possible that there is connected in parallel with each series circuit formed by the switching cell 2 and at least one inductance 3 at least one further series circuit formed by a two-pole switching cell 2 for switching at least one positive and at least one negative voltage between the poles and at least one further inductance 3.

For protection in the fault situation of a switching cell 2, a short-circuiting element can be connected in parallel with each switching cell 2.

Exemplary embodiments of a system including such a direct converter according to the present disclosure are illustrated in FIGS. 4-16 and are described in detail below. FIGS. 4-8, FIG. 10, FIG. 13 and FIG. 14 illustrate, by way of example, a system for coupling a three-phase electrical AC voltage system 5 to a two-phase electrical AC voltage system, for example, for a railroad system coupling. FIG. 9, FIG. 11, FIG. 12, FIG. 15 and FIG. 16 illustrate, by way of example, a system for coupling a three-phase electrical AC voltage system 5 to an electrical load, for example, a rotating electrical machine. In the case of an exemplary system according to the present disclosure including an above-described direct converter 1 in accordance with exemplary embodiments of the present disclosure, the direct converter 1 can be connected to an electrical AC voltage system 5 at the input phase connections U1, V1, W1 via a transformer 4, as shown, by way of example, in FIG. 4, FIGS. 7-10, FIG. 13 and FIG. 14. As an alternative to this, the direct converter 1 according to exemplary embodiments of the present disclosure can be connected to the electrical AC voltage system at at least one input phase connection U1, V1, W1 of the direct converter 1 via an input fault current limiting inductor 6, as shown, by way of example, in FIG. 6, but also in FIG. 5 and FIG. 14-16. If an input phase connection U1, V1, W1 is grounded, it is possible to dispense with an input fault current limiting inductor 6 at this input phase connection U1, V1, W1. The respective input fault current limiting inductor 6 limits a large input-side current that is possible in the fault situation, and thereby protects the direct converter 1 against damage or destruction. In accordance with the exemplary embodiments illustrated in FIGS. 11 and 12, it is also conceivable, for applications for the operation of a rotating electrical machine, for example, for the input phase connections U1, V1, W1 to be directly connected to an electrical AC voltage system 5. The construction of the exemplary systems according to the present disclosure can thus be realized in a simple manner overall.

Furthermore, in accordance with an exemplary system of the present disclosure, an output fault current limiting inductor 7 can be optionally connected to at least one output phase connection U2, V2, W2 of the direct converter 1, as shown, by way of example, in FIGS. 4-8, FIG. 10, FIG. 13 and FIG. 14. If an output phase connection U2, V2, W2 is grounded, it is possible to dispense with an output fault current limiting inductor 7 at this output phase connection U2, V2, W2. The respective output fault current limiting inductor 7 limits a large output-side current that is possible in the fault situation, and thereby protects the direct converter 1 against damage or destruction.

Figure 7:
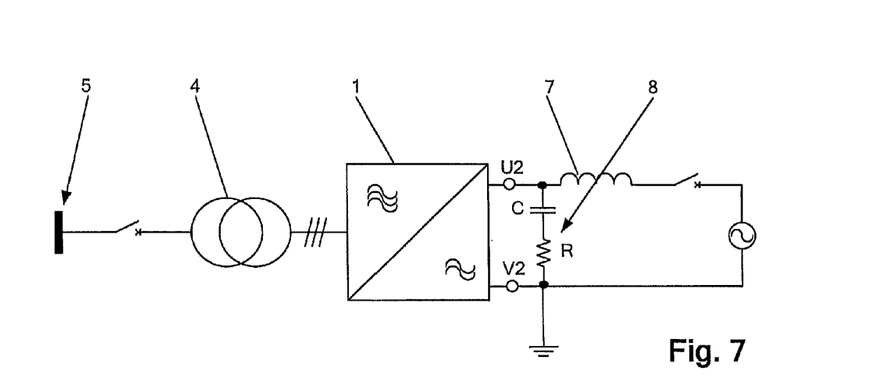
FIG. 7 shows a fourth exemplary embodiment of a system.

In accordance with the exemplary embodiment illustrated in FIG. 7, it is possible for an RC filter 8 formed by a series circuit including a resistor R and a capacitance C to be connected to the output fault current limiting inductor 7 and grounded, in order to achieve a limiting of the voltage gradient du/dt acting on the insulations (transformer, cables).

Figure 8:
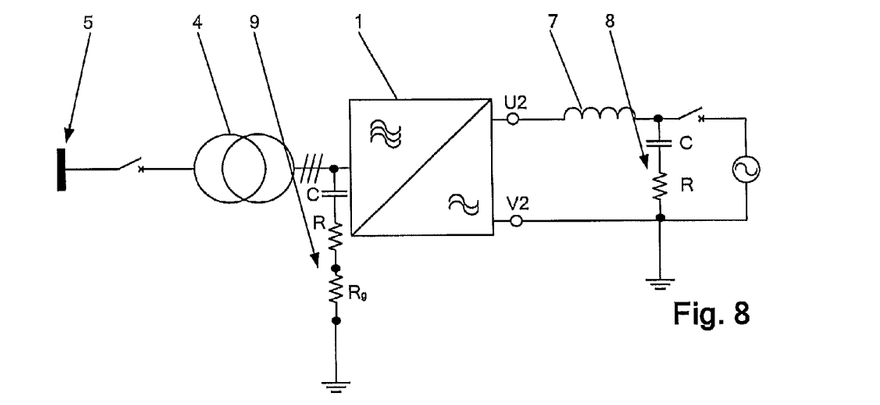
FIG. 8 shows a fifth exemplary embodiment of a system.
Figure 9:
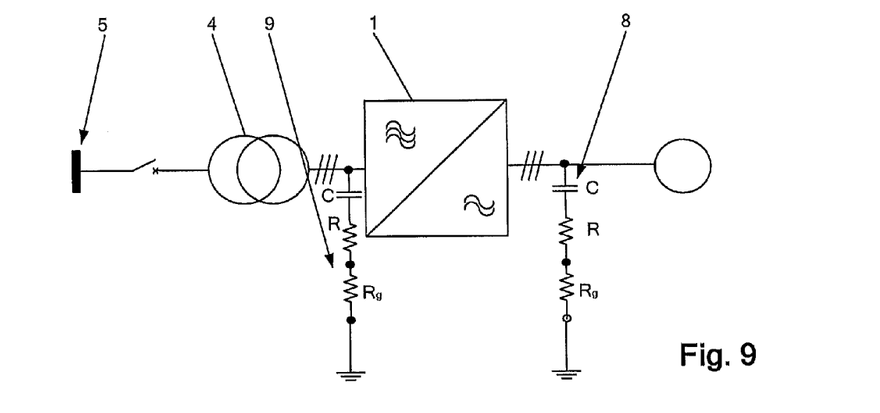
FIG. 9 shows a sixth exemplary embodiment of a system.

In accordance with the exemplary embodiments illustrated in FIGS. 8 and 9, it is also possible that each input phase connection U1, V1, W1 is connected to a respective edge filter 9 formed by a series circuit including a resistor R and a capacitance C. The edge filters 9 can then be connected to one another, and the junction point can be grounded via a grounding resistor $R_g$. Such an edge filter also can limit the voltage gradient du/dt acting on the insulations (transformer, cables). Optionally, the junction point of the edge filters 9 can be connected to the grounding of the RC filter 8 in order to achieve a coupling of the two filters 8, 9.

Figure 10:
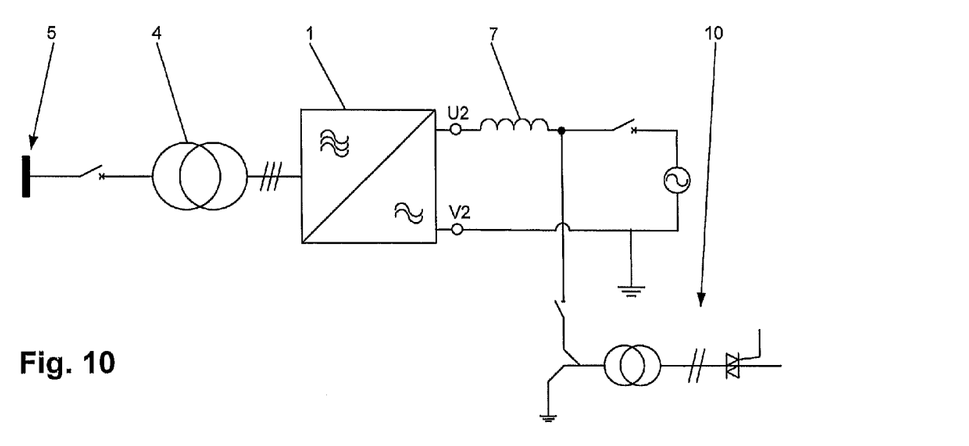
FIG. 10 shows a seventh exemplary embodiment of a system.
Figure 11:
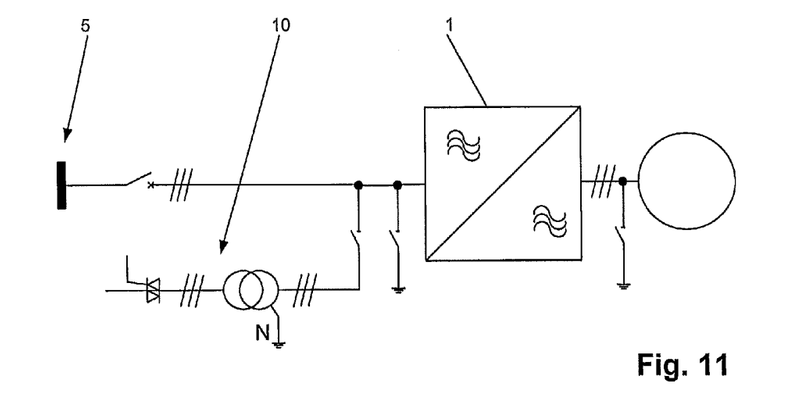
FIG. 11 shows an eighth exemplary embodiment of a system.
Figure 12:
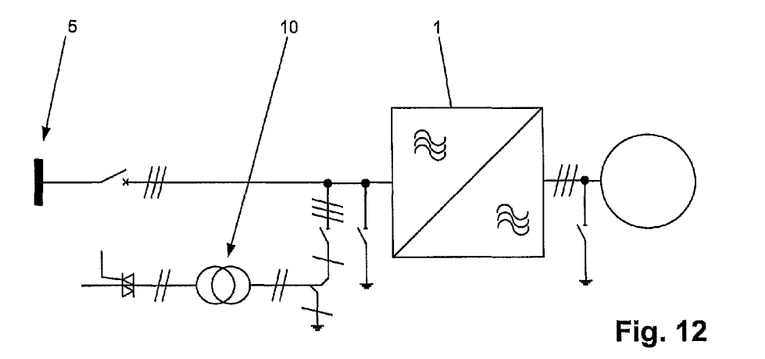
FIG. 12 shows a ninth exemplary embodiment of a system.
Figure 13:
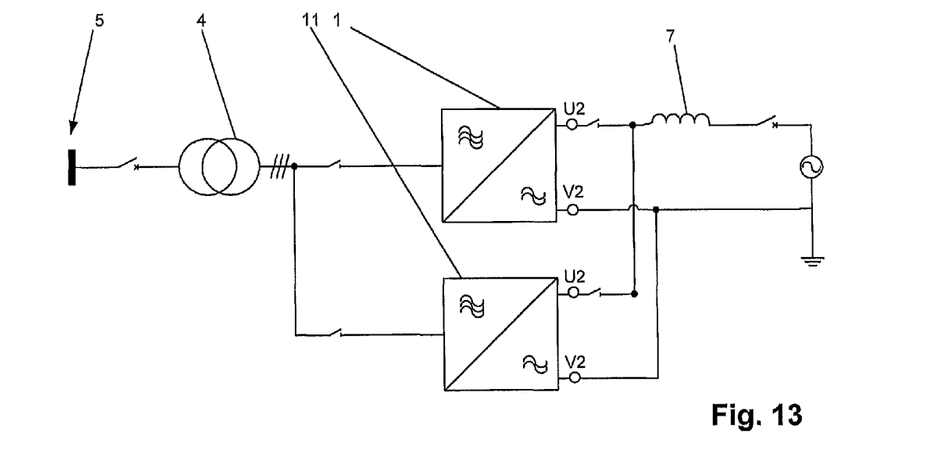
FIG. 13 shows a tenth exemplary embodiment of a system.
Figure 14:
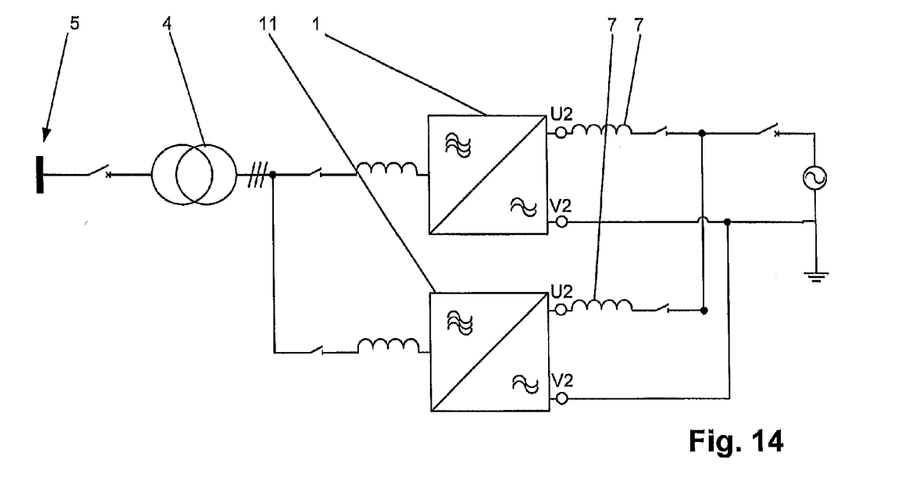
FIG. 14 shows an eleventh exemplary embodiment of a system.
Figure 15:
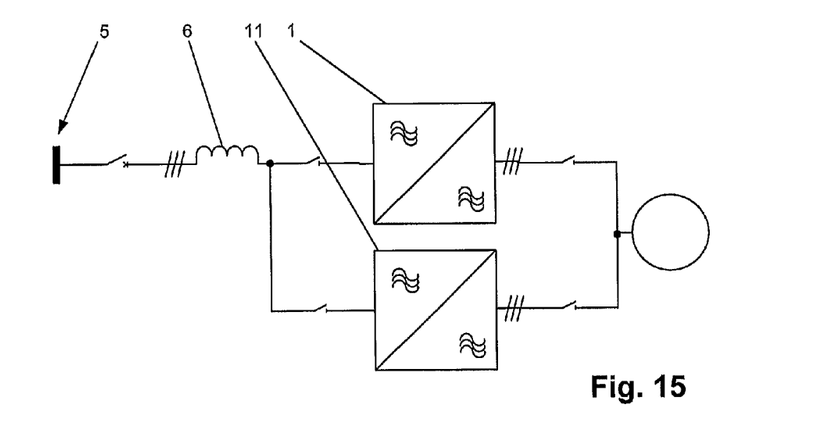
FIG. 15 shows a twelfth exemplary embodiment of a system.

In accordance with an exemplary system according to the present disclosure, a charging device 10 can be connected to at least one input phase connection U1, V1, W1 as illustrated in FIGS. 11 and 12, for example. If, as explained above, an input fault current limiting inductor 6 is connected to at least one input phase connection U1, V1, W1 of the direct converter 1, it is also conceivable for a charging device 10 to then be connected to this input fault current limiting inductor 6. Furthermore, such a charging device 10 can also be connected to the output fault current limiting conductor 7, as shown in the example of FIG. 10. In the case where an output fault current limiting inductor 7 is connected to at least one output phase connection U2, V2, W2 of the direct converter 1, it is also conceivable for a charging device 10 to then be connected to this output fault current limiting inductor 7. Generally, the charging device 10 advantageously can charge the capacitive energy stores of the switching cells 2. According to an exemplary embodiment, the charging device 10 can include a medium-voltage disconnector, a single-phase, possibly adjustable charging transformer, which generates the required charging voltage from a suitable auxiliary voltage, and a charging current limiting measure (an AC power controller or charging resistor) on any desired side of the charging transformer. It is conceivable for a plurality of direct converters 1 to share one charging device 10. Each direct converter 1 can be connected to the charging device via a dedicated disconnector, and a direct converter 1 to be charged can then be connected to the charging device 10 by the respective disconnector being closed.

Figure 16:
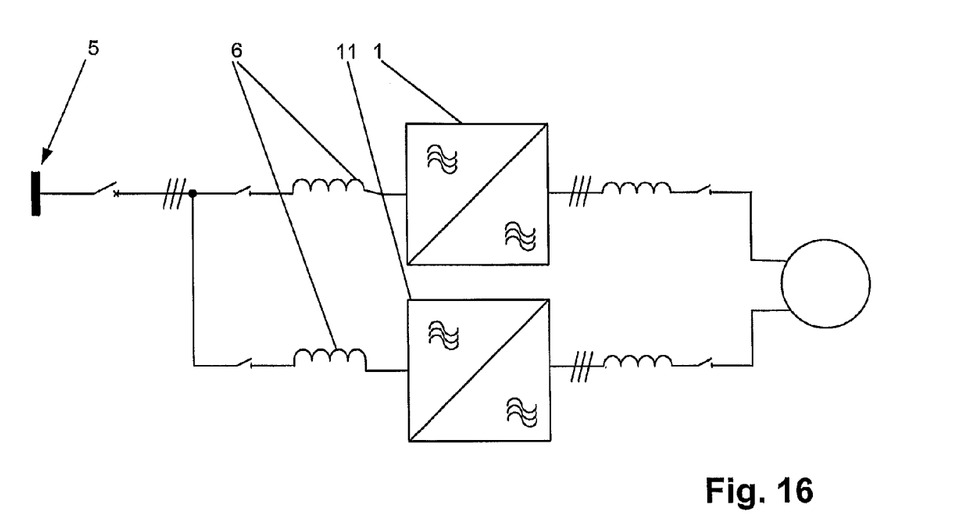
FIG. 16 shows a thirteenth exemplary embodiment of a system.

In accordance with an exemplary system according to the present disclosure, at least one further direct converter 11 can also be provided. This further direct converter 11 can be embodied, for example, like a direct converter 1 according to exemplary embodiments of the present disclosure as already described above, where the number n of input phase connections U1, V1, W1 of the respective further direct converter 11 corresponding to the number n of input phase connections U1, V1, W1 of the direct converter 1 and the number p of output phase connections U2, V2, W2 of the respective further direct converter 11 corresponding to the number p of output phase connections U2, V2, W2 of the direct converter 1. According to an exemplary embodiment, the respective further direct converter 11, at the input phase connections U1, V1, W1 and output phase connections U2, V2, W2 of the respective further direct converter 11, can be connected in parallel with the direct converter 1 at the input phase connections U1, V1, W1 and output phase connections U2, V2, W2 of the direct converter 1, as shown, by way of example, in FIG. 13 and FIG. 15. Depending on the application, it may also be expedient for the respective further direct converter 11 to be connected in parallel with the direct converter 1 in accordance with FIG. 14. An output-side connection of the further direct converter 11 to the direct converter 1 via an electrical load, for example, via windings of a rotating electrical machine, as shown by way of example in FIG. 16, is also conceivable.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Direct converter
2 Switching cell
3 Inductance
4 Transformer
5 Electrical AC voltage system
6 Input fault current limiting inductor
7 Output fault current limiting inductor
8 RC filter
9 Edge filter
10 Charging device
11 Further direct converter

What is claimed is:
1. A direct converter comprising:
   n input phase connections, where n≧2;
   p output phase connections, where p≧2;
   (n·p) two-pole switching cells for switching at least one positive voltage and at least one negative voltage between the poles, wherein:
   each output phase connection is respectively connected in series with each input phase connection via a corresponding one of the switching cells; and at least one inductance is connected into each series connection of a corresponding one of the n input phase connections and a corresponding one of the p output phase connections.

2. The direct converter as claimed in claim 1, wherein each switching cell has four drivable bidirectional power semiconductor switches having a controlled unidirectional current-carrying direction, said power semiconductor switches being connected in a bridge circuit, and a capacitive energy store being connected in parallel with the bridge circuit of the power semiconductor switches.

3. The direct converter as claimed in claim 1, comprising:
at least one further two-pole switching cell for switching at least one positive voltage and at least one negative voltage between the poles, the at least one further two-pole switching cell being connected into each series connection.

4. The direct converter as claimed in claim 1, comprising:
at least one further two-pole switching cell for switching at least one positive voltage and at least one negative voltage between the poles, the at least one further two-pole switching cell being connected in parallel with each switching cell.

5. The direct converter as claimed in claim 1, comprising:
at least one further series circuit connected in parallel with each series circuit formed by the switching cell and at least one inductance, the at least one further series circuit being formed by a two-pole switching cell for switching at least one positive voltage and at least one negative voltage between the poles and at least one further inductance.

6. The direct converter as claimed in claim 1, comprising:
a short-circuiting element connected in parallel with each switching cell.

7. A system comprising:
a transformer;
an electrical AC voltage system; and
a direct converter as claimed in claim 1 connected to the electrical AC voltage system at the input phase connections of the direct converter via the transformer.

8. A system comprising:
an input fault current limiting inductor;
an electrical AC voltage system; and
a direct converter as claimed in claim 1 connected to the electrical AC voltage system at at least one input phase connection of the direct converter via the input fault current limiting inductor.

9. The system as claimed in claim 7, comprising:
an output fault current limiting inductor connected to at least one output phase connection of the direct converter.

10. The system as claimed in claim 9, comprising:
an RC filter connected to the output fault current limiting inductor and grounded, the RC filter being formed by a series circuit comprising a resistor and a capacitance.

11. The system as claimed in claim 7, comprising:
edge filters respectively connected a corresponding one of each input phase connection, each edge filter being formed by a series circuit comprising a resistor and a capacitance, wherein
the edge filters are connected to one another, and junction point therebetween is grounded via a grounding resistor.

12. The system as claimed in claim 7, comprising:
a charging device connected to at least one input phase connection.

13. The system as claimed in claim 9, comprising:
a charging device connected to the output fault current limiting inductor.

14. The system as claimed in claim 7, comprising:
at least one further direct converter, wherein
the number n of input phase connections of the further direct converter corresponding to the number n of input phase connections of the direct converter and the number p of output phase connections of the further direct converter corresponding to the number p of output phase connections of the direct converter, respectively, and wherein
the further direct converter, at the input phase connections and output phase connections of the further direct converter, is connected in parallel with the direct converter at the input phase connections and output phase connections of the direct converter, respectively.

15. The direct converter as claimed in claim 2, comprising:
at least one further two-pole switching cell for switching at least one positive voltage and at least one negative voltage between the poles, the at least one further two-pole switching cell being connected into each series connection.

16. The direct converter as claimed in claim 2, comprising
at least one further two-pole switching cell for switching at least one positive voltage and at least one negative voltage between the poles, the at least one further two-pole switching cell being connected in parallel with each switching cell.

17. The direct converter as claimed in claim 1, comprising
at least one further series circuit connected in parallel with each series circuit formed by the switching cell and at least one inductance, the at least one further series circuit being formed by a two-pole switching cell for switching at least one positive voltage and at least one negative voltage between the poles and at least one further inductance.

18. The system as claimed in claim 8, comprising:
an output fault current limiting inductor connected to at least one output phase connection of the direct converter.

19. The system as claimed in claim 18, comprising:
an RC filter connected to the output fault current limiting inductor and grounded, the RC filter being formed by a series circuit comprising a resistor and a capacitance.

20. The system as claimed in claim 8, comprising:
edge filters respectively connected a corresponding one of each input phase connection, each edge filter being formed by a series circuit comprising a resistor and a capacitance, wherein
the edge filters are connected to one another, and junction point therebetween is grounded via a grounding resistor.

21. The system as claimed in claim 8, comprising:
a charging device connected to at least one input phase connection.

22. The system as claimed in claim 8, comprising:
at least one further direct converter, wherein
the number n of input phase connections of the further direct converter corresponding to the number n of input phase connections of the direct converter and the number p of output phase connections of the further direct converter corresponding to the number p of output phase connections of the direct converter, respectively, and wherein
the further direct converter, at the input phase connections and output phase connections of the further direct converter, is connected in parallel with the direct converter at the input phase connections and output phase connections of the direct converter, respectively.

* * * * *